Dec. 27, 1960  L. C. GALLEHER  2,966,237
PNEUMATIC CONE BRAKE
Filed June 15, 1959  2 Sheets-Sheet 1

INVENTOR.
LOUIS C. GALLEHER,

By His Attorneys.

HARRIS, KIECH, RUSSELL & KERN.

Dec. 27, 1960  L. C. GALLEHER  2,966,237
PNEUMATIC CONE BRAKE
Filed June 15, 1959  2 Sheets-Sheet 2

INVENTOR.
LOUIS C. GALLEHER,
BY HIS ATTORNEYS.
HARRIS, KIECH, RUSSELL & KERN

United States Patent Office 2,966,237
Patented Dec. 27, 1960

2,966,237

PNEUMATIC CONE BRAKE

Louis C. Galleher, Long Beach, Calif., assignor to Salsbury Corporation, Los Angeles, Calif., a corporation of California Filed June 15, 1959, Ser. No. 820,443

2 Claims. (Cl. 188—71)

It is an object of the invention to provide a brake which may be engaged and disengaged at high speeds such as in the order of 8,000 revolutions per minute and which will produce minimum windage and frictional drag when operating at such high speeds while disengaged. A further object is to provide such a brake suitable for use in coupling turbines to electrical alternators. Another object is to provide such a brake suitable for use in starting, stopping and speed-changing in alternator drives. A further object is to provide such a brake suitable for use with alternators operating at speeds in the range of 8,000 revolutions per minute with outputs in the order of 60 kilovolt-amperes and over wide ranges of ambient temperature and pressure.

It is an object of the invention to provide a brake utilizing a plurality of coaxial, conical braking surfaces with a rotating element positioned between a fixed element and a sliding element. A further object is to provide such a structure wherein the sliding element may be moved axially toward the fixed element to clamp the rotating element therebetween. Another object is to provide such a structure wherein the rotating element is urged axially away from the fixed element to provide operating clearance in the disengaged condition. A further object is to provide such a brake which requires no adjustment during its operating life.

It is an object of the invention to provide a brake wherein the fixed element and the sliding element are carried in a housing with the sliding element serving as a piston in a fluid-operated cylinder carried on the housing. Another object is to provide such a structure wherein the piston and cylinder may be constructed as a unit for insertion and removal from the housing.

It is an object of the invention to provide a brake suitable for use with planetary transmissions and the like wherein the rotating element is provided with an internal ring gear and is mounted on a rotating member of the transmission having a mating external ring gear permitting axial sliding motion of the rotating element of the brake. A further object is to provide such a structure wherein spring means for urging the rotating brake element to the disengaged position is provided with an internal ring gear for mounting on the external ring gear of the rotating member of the transmission.

The invention also comprises novel details of construction and novel combinations and arrangements of parts, which will more fully appear in the course of the following description. The drawings merely show and the description merely describes a preferred embodiment of the present invention which is given by way of illustration or example.

Figure 1:
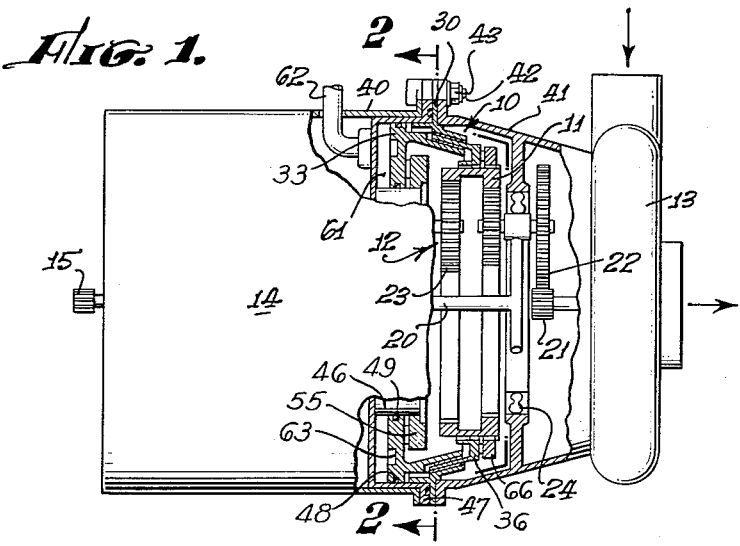
Fig. 1 is a partially sectional view showing the brake of the invention in combination with a planetary transmission of a turbine-driven alternator.
Figure 2:
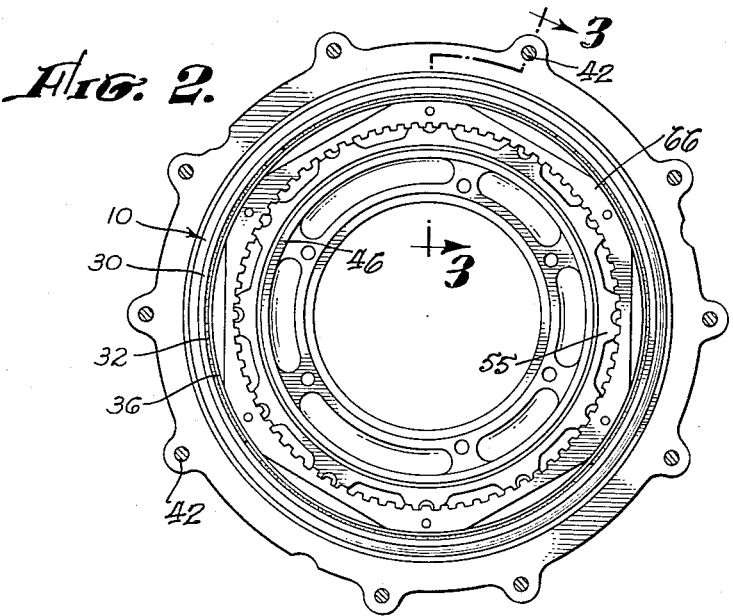
Fig. 2 is an enlarged sectional view taken along the line 2—2 of Fig. 1.
Figure 5:
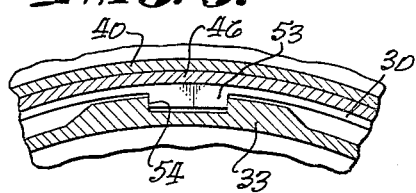
Fig. 5 is a sectional view taken along the line 5—5 of Fig. 4.

Fig. 1 shows a typical application of the invention wherein a brake 10 is applied to a ring gear 11 of a compound planetary transmission 12 used in coupling a turbine 13 to an alternator 14 and a drive shaft 15. A prime mover may be connected to the drive shaft 15 and the turbine 13 may provide various functions through the transmission including driving the alternator while the prime mover is stationary, serving as a starter for the prime mover, and providing speed control for the alternator while the alternator is being driven by the prime mover.

The drive shaft 15 passes through the alternator 14 and is directly connected to a planet gear carrier 20. When the prime mover is stationary, the turbine 13 drives the alternator 14 through a turbine sun gear 21, planet gears 22, the ring gear 11, and planet gears 23 to an alternator sun gear on the alternator shaft, with the planet carrier 20 prevented from reverse rotation by means of a sprag clutch 24 and with the brake 10 in the disengaged condition permitting the ring gear 11 to rotate freely.

For starting the prime mover by means of the turbine, the ring gear 11 of the planetary transmission is locked in place by the brake and power is transmitted from the turbine sun gear 21 to the turbine planet gears 22 and to the planet carrier 20 and the drive shaft 15. The starting function may be initiated while the turbine is running at full speed by engaging the brake, resulting in transfer of full turbine load from the alternator to the prime mover while operating at full speed.

The alternator may be driven by the prime mover through the planet carrier 20 and the alternator planet gears 23 with the ring gear 11 held stationary by the engaged brake 10. Alternatively, the speed of the alternator can be controlled while being driven from the prime mover by leaving the ring gear 11 free to rotate and controlling its rate of rotation by means of the turbine 13.

Figure 3:
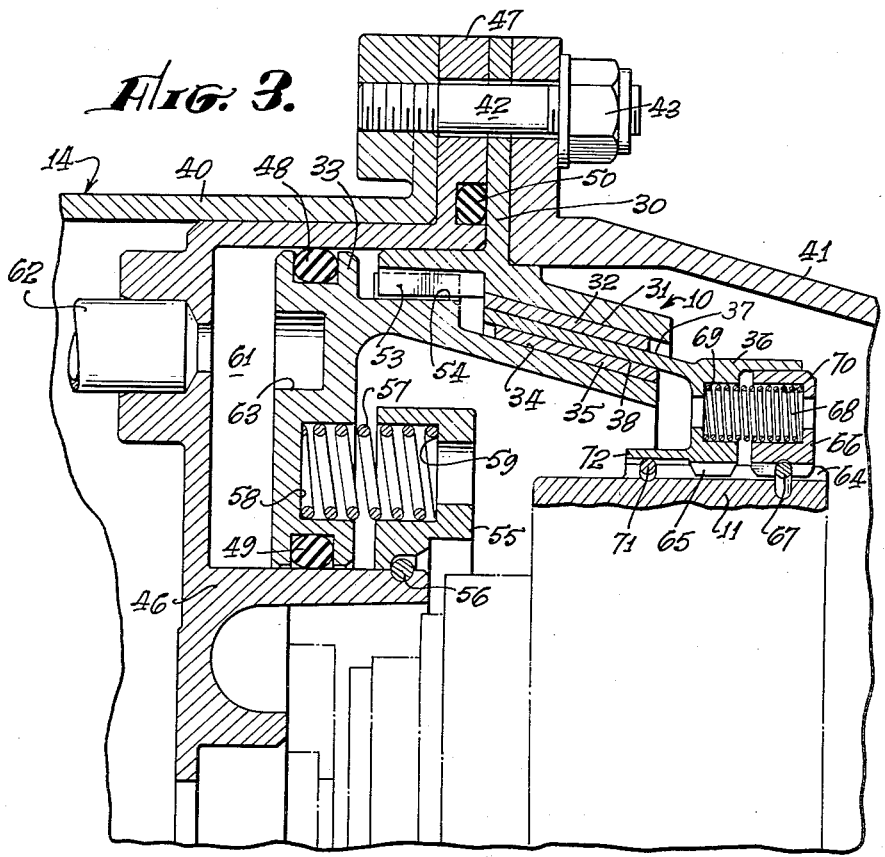
Fig. 3 is an enlarged partially sectional view taken along the line 3—3 of Fig. 2 showing the brake in the engaged position.
Figure 4:
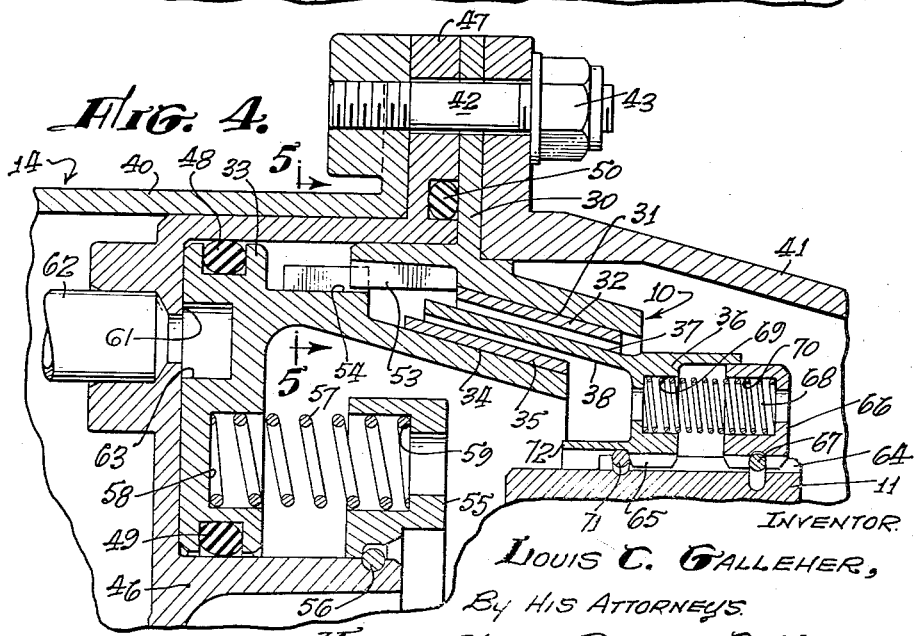
Fig. 4 is a view similar to that of Fig. 3 showing the brake in the disengaged position.

The structure of the brake itself is best seen in Figs. 3 and 4. The brake includes a stationary brake member 30 having a conical braking surface 31 with a brake lining 32 applied thereto, a sliding brake member 33 having a conical braking surface 34 with a brake lining 35 applied thereto, and a rotating brake member 36 having conical braking surfaces 37, 38. The three brake members are mounted with the conical braking surfaces coaxial and with the surfaces of the rotating brake member disposed between the surfaces of the stationary and sliding brake members.

The rotating brake member is adapted for mounting on a rotating element such as the ring gear 11. The fixed brake member 30 is adapted for mounting on a fixed element such as the alternator housing which comprises a shell 40 and another shell 41 which are clamped together by studs 42 and nuts 43 with the stationary member 30 therebetween.

The sliding brake member 33 is adapted for mounting in the housing for movement along the axis of the conical braking surfaces toward and away from the stationary brake member. In the embodiment illustrated herein, the sliding brake member is moved toward the stationary brake member by fluid pressure with the sliding brake member serving as a piston in a fluid-energized cylinder 46. The cylinder may be built integral with the housing, such as in the shell 40, but is preferably made a separate unit as shown in Figs. 3 and 4 so that the piston and cylinder may be assembled and inserted and removed as a unit. In the preferred embodiment, the cylinder 46 is annular and is provided with an annular flange 47 for clamping between the two shells of the housing together with the stationary brake member 30. O-ring seals, 48, 49 are provided at the outer and inner peripheries of the piston portion of the sliding member 33 to provide a pressure seal with the cylinder. Another O-ring seal 50 is provided in the flange 47 for sealing contact with the stationary member 30. A number of guide bosses 53 are radially disposed around the stationary member 30 for engagement with mating guide grooves 54 in the sliding member 33 to serve as guides for the sliding movement of the member 33.

A spring retainer ring 55 is carried on the cylinder 46, being held in place by a retainer ring 56. A plurality of compression coil springs 57 is positioned in aligned openings 58, 59 in the sliding member 33 and the ring 55 to provide a force urging the sliding member toward the disengaged condition (to the left as seen in Figs. 3 and 4). The sliding member 33 is moved to the engaged condition by introducing fluid under pressure into a chamber 61 in the cylinder 46 through a conduit 62. An annular groove 63 is provided in the face of the sliding member 33 opposite the inlet opening for the conduit 62 to provide force equalization around the annular sliding member.

While the rotating brake member 36 may be mounted on the ring gear 11 by various conventional means, in the present embodiment, the ring gear 11 is also made as an external ring gear having external teeth 64 and the rotating member 36 is made as an internal ring gear having internal teeth 65 for mating engagement with the external ring gear 11. A spring retainer ring 66 is mounted on the ring gear 11, the ring 66 preferably also being provided with internal ring gear teeth for mating engagement with the ring gear 11. The spring retainer ring 66 is held in place on the ring gear 11 by a retainer ring 67. A plurality of springs 68 is positioned in aligned openings 69, 70 of the rotating member 36 and the retainer ring 66, respectively, for urging the rotating member to the disengaged position as seen in Fig. 4. Axial sliding motion of the rotating member is limited by a retainer ring 71 carried on the ring gear 11. The ring 71 is held in place against centrifugal force by an annular flange 72 on the rotating member 36 while the ring 67 is similarly held in place by the ring 66.

The brake is shown in the disengaged condition in Fig. 4. The sliding member 33 is moved to the extreme left position by the springs 57 and the rotating member 36 is moved to the left into engagement with the ring 71 by the springs 68. The parts are so dimensioned that the rotating member is spaced from both the stationary member and the sliding member. The brake is engaged by introducing fluid under pressure into the cylinder 46, which moves the sliding member 33 to the right bringing the brake lining 35 into engagement with the surface 38 of the rotating member 36. This engagement also moves the rotating member to the right bringing the surface 37 into engagement with the brake lining 32. The force exerted by the fluid in the cylinder 46 works against the springs 57 and the springs 68 to clamp the rotating member between the sliding and stationary members. The braking force is a function of the fluid pressure, permitting the structure to be used as a clutch by gradually increasing and decreasing the pressure.

The provision of concentric, conical, braking surfaces with two of the members being movable along the axis of the surfaces provides for positive clamping of the three members together independent of dimentional changes at the braking surfaces due to wear of the brake linings. The positions of the sliding brake member and the rotating brake member are fixed while in the disengaged condition thus providing positive control of the running clearance between the members. A floating support for the rotating member on the ring gear is achieved by the mating internal and external gear teeth thus improving the alignment of the braking surfaces and compensating for inaccuracies in machining and wear in the parts.

The unique design of the brake of the invention permits a package installation with the sliding member carried in the cylinder and with the cylinder and fixed member clamped together in the housing, permitting the sliding member and the fixed member to be preassembled. The rotating member is a sliding fit over the ring gear of the transmission so that it may easily be installed and removed.

The brake of the invention provides a compact and efficient brake suitable for use at high loads and under adverse operating conditions. The concentric, conical braking surfaces 37, 38 on the rotating member permit a light weight construction relative to the torque capacity of the unit. The heat generated at the braking surfaces during engagement of the brake under full load must be dissipated in order to prevent distortion of the brake members. In the heavy load embodiments of the unit, the rotating brake member is preferably made of steel while the stationary and sliding members are made of a light material having a high coefficient of heat transfer, such as aluminum. The brake lining is preferably a frictional material with a high percentage of metal in order to rapidly conduct heat from the surface of the steel cone into the aluminum cones. Examples of suitable braking material are sintered metal or semimetallic molded. The aluminum cones have a high rate of heat transfer and provide satisfactory cooling of the braking surfaces.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a brake, the combination of: an annular pressure cylinder; a first member for mounting on said cylinder, said first member having a conical braking surface disposed coaxial with said cylinder; a second member having a conical braking surface, with said second member mounted in said cylinder for sliding movement as a piston with said conical surfaces coaxial; an external ring gear; a third member having a pair of concentric, conical braking surfaces, said third member having an internal ring gear coaxial with said conical surfaces for axial sliding engagement with said external ring gear; means carried on said external ring gear for urging said third member away from said first member; a stop ring positioned around said external ring gear for limiting movement of said third member away from said first member, said third member including an annular flange overlying said stop ring for maintaining said ring in engagement with said ring gear; spring means mounted in said cylinder in engagement with said second member for urging said second member away from said first and third members; and means for introducing a fluid under pressure into said cylinder for urging said second member toward said first member for clamping said third member therebetween.

2. In a brake for locking a rotating element to a fixed element with the rotating element having an external ring gear concentric with the axis of rotation, the combination of: a stationary brake member affixed to said fixed element; a sliding brake member mounted on said fixed element for sliding movement along said axis; a rotating brake member having an internal ring gear for mating engagement with said external ring gear, with said rotating brake member carried on said rotating element for sliding movement along said axis and with said rotating brake member disposed between said stationary and sliding brake members; a spring retainer ring having an internal ring gear for mating engagement with said external ring gear; means for fixing said spring retainer ring on said rotating element for preventing relative axial movement therebetween; spring means positioned between said spring retainer ring and said rotating brake member for urging said rotating brake member along said axis away from said spring retainer ring and said stationary brake member; a stop ring carried on said external ring gear for limiting movement of said rotating brake member, said rotating brake member having an annular flange overlying said stop ring for maintaining said stop ring in position on said external ring gear; and means for urging said sliding brake member toward said rotating brake member for compressing said spring means and clamping said rotating brake member between said sliding and stationary brake members.

References Cited in the file of this patent

UNITED STATES PATENTS

| | | |
|---|---|---|
| 1,316,057 | Parker | Sept. 16, 1919 |
| 2,069,408 | Forichon | Feb. 2, 1937 |
| 2,238,943 | McCune et al. | Apr. 22, 1941 |
| 2,558,738 | Davis et al. | July 3, 1951 |